United States Patent
Crockett (10) Patent No.: US 11,400,360 B1
(45) Date of Patent: Aug. 2, 2022

(54) ELECTRONICALLY CONTROLLED DETACHABLE MOTORIZED TRACK SYSTEM FOR SPORTS APPARATUS

(71) Applicant: Stewart J. Crockett, Tacoma, WA (US)

(72) Inventor: Stewart J. Crockett, Tacoma, WA (US)

( * ) Notice: Subject to any disclaimer, the term of this patent is extended or adjusted under 35 U.S.C. 154(b) by 3 days.

(21) Appl. No.: 17/178,000

(22) Filed: Feb. 17, 2021

(51) Int. Cl.
| | |
|---|---|
| A63C 5/03 | (2006.01) |
| A63C 5/08 | (2006.01) |
| G05D 1/00 | (2006.01) |
| B62D 55/15 | (2006.01) |
| B60L 50/60 | (2019.01) |
| B62D 55/06 | (2006.01) |

(52) U.S. Cl.
CPC ............... *A63C 5/085* (2013.01); *A63C 5/03* (2013.01); *B60L 50/60* (2019.02); *B62D 55/06* (2013.01); *B62D 55/15* (2013.01); *G05D 1/0022* (2013.01)

(58) Field of Classification Search
CPC ........... A63C 5/085; A63C 5/03; B60L 50/60; B62D 55/06; B62D 55/15; G05D 1/0022
See application file for complete search history.

(56) References Cited

U.S. PATENT DOCUMENTS

| | | | | |
|---|---|---|---|---|
| 2006/0012096 A1* | 1/2006 | Geldert | | B60R 9/045 |
| | | | | 269/203 |
| 2022/0098827 A1* | 3/2022 | Fliearman et al. | ... | E02F 9/2079 |

FOREIGN PATENT DOCUMENTS

| | | | | |
|---|---|---|---|---|
| CN | 108674502 B | * | 3/2021 | ............. B60S 1/64 |
| ES | 2676353 A1 | * | 7/2018 | ............. A63C 5/085 |
| WO | WO-2012142497 A1 | * | 10/2012 | ............. B60G 3/20 |
| WO | WO-2015161329 A1 | * | 10/2015 | ............. A63C 5/035 |
| WO | WO-2016110759 A1 | * | 7/2016 | ............. A63C 5/03 |
| WO | WO-2020216220 A1 | * | 10/2020 | ............. A63C 5/033 |

\* cited by examiner

*Primary Examiner* — James A Shriver, II
*Assistant Examiner* — Michael T. Walsh (57) ABSTRACT

An electronically controlled detachable motorized track system for a snowboard having front and rear baseplates sized to fit in a backpack with right and left motorized tracks having a length extending beyond the front and rear baseplates from proximate the rear of a snowboard to proximate the front of a snowboard and beyond the front and rear baseplates, each adapted for wrapping around drive rollers and freely rotating rear rollers. A hand controller wirelessly controls the tracks.

20 Claims, 11 Drawing Sheets

ELECTRONICALLY CONTROLLED DETACHABLE MOTORIZED TRACK SYSTEM FOR SPORTS APPARATUS

TECHNICAL FIELD

The present invention relates to a detachable motorized track system for sports apparatus, and, more particularly, to a detachable motorized track system for a snowboard adapted to be carried in a backpack.

BACKGROUND

Snowboard users typically must spend hundreds of dollars per season for lift tickets in order to be towed up a mountain in order to snowboard down. It would be economically advantageous for such users to be able to power their snowboards up a mountain using a power device. Such devices have been proposed, but the state-of-the-art lacks a useful, stable device which can be detached and stored in a backpack for a ride down with a power pack that can be recharged, as necessary.

The present invention overcomes the failings of the prior art.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

Here disclosed is an electronically controlled detachable motorized track system for a snowboard having front and rear baseplates sized to fit in a backpack with right and left motorized tracks having a length extending beyond the front and rear baseplates from proximate the rear of a snowboard to proximate the front of a snowboard and beyond the front and rear baseplates, each adapted for wrapping around drive rollers and freely rotating rear rollers. A hand controller wirelessly controls the tracks.

BRIEF DESCRIPTION OF THE DRAWINGS

While the novel features of certain embodiments of the invention are set forth with particularity in the appended claims, the invention, both as to organization and content, will be better understood and appreciated, along with other objects and features thereof, from the following detailed description taken in conjunction with the drawings, in which:

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE EMBODIMENTS

The following disclosure describes an electronically controlled detachable motorized track system. Several features of methods and systems in accordance with example embodiments are set forth and described in the figures. It will be appreciated that methods and systems in accordance with other example embodiments can include additional procedures or features different than those shown in the figures. Example embodiments are described herein with respect to an electronically controlled detachable motorized track system for snowboards. However, it will be understood that these examples are for the purpose of illustrating the principles, and that the invention is not so limited.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an example" or combinations and/or variations of these terms means that a particular feature, structure or characteristic described in connection with the example is included in at least one embodiment of the present disclosure. Thus, the appearances of the phrases "in one example" or "in an example" in various places throughout this specification are not necessarily all referring to the same example or embodiment. Furthermore, the particular features, structures, or characteristics may be combined in any suitable manner in one or more embodiments.

Definitions

Generally, as used herein, the following terms have the following meanings when used within the context of motorized tracked vehicles:

The articles "a" or "an" and the phrase "at least one" as used herein refers to one or more.

As used herein, "plurality" is understood to mean more than one. For example, a plurality refers to at least two, three, four, five, ten, 25, 50, 75, 100, 1,000, 10,000 or more.

"Bluetooth®" technology, as used herein means a commercially available low-power wireless connectivity technology used to stream audio, transfer data and broadcast information between devices. Bluetooth® technology is a wireless technology standard for exchanging data between fixed and mobile devices over short distances using short-wavelength UHF radio waves in the industrial, scientific and medical radio bands, for example, from 2.400 to 2.485 GHz. This technology is available from Bluetooth SIG, Inc. of Kirkland, Wash.

As used herein, "mobile device" has its generally accepted meaning and includes any portable device that can make and receive telephone calls to and from a public telephone network, which includes cellular telephones, and other mobile and fixed-line phones across the world. It also includes mobile devices that support a wide variety of other services such as Voice over Internet Protocol (VOIP), text messaging, software applications, MMS, e-mail, Internet access, short-range wireless communications (for example, infrared and Bluetooth® communications).

As used in this specification, the terms "controller", "Bluetooth® controller", "computer", "processor" and "computer processor" encompass a personal computer, a tablet computer, a smart phone, a microcontroller, a microprocessor, a field programmable object array (FPOA), a digital signal processor (DSP), an application-specific integrated circuit (ASIC), a field programmable gate array (FPGA), a programmable logic array (PLA), or any other digital processing engine, device or equivalent capable of executing software code including related memory devices, transmission devices, pointing devices, input/output devices, displays and equivalents. In particular, a Bluetooth® controller incorporates Bluetooth® technology as well as other electronic circuits.

"Obtaining" is understood herein as manufacturing, purchasing, or otherwise coming into possession of.

"Bluetooth® module" (BT module) is a module capable of receiving Bluetooth® wireless signals and translating the Bluetooth signals into electronic command and control signals. One such device is the model line VESC as sold by FLIPSKY of Dongguan City, China.

Figure 1:
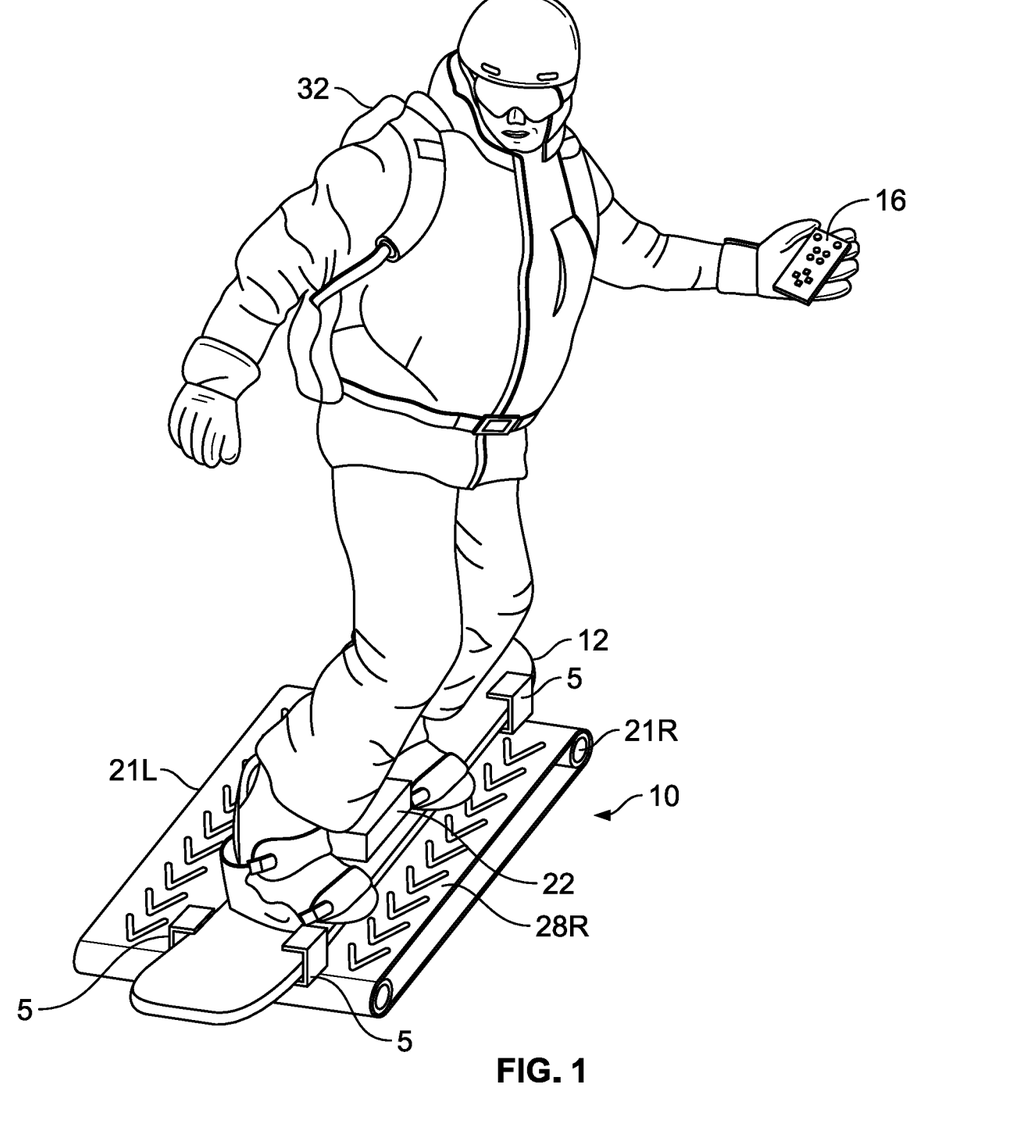
FIG. 1 schematically shows an example of an electronically controlled detachable motorized track system in operational use on a snowboard.

Referring now to FIG. 1, an example of an electronically controlled detachable motorized track system in operational use on a snowboard is schematically shown. An electronically controlled detachable motorized track system 10 includes a right motorized track 21R and a left motorized track 21L, a battery housing 22, a BT hand controller 16 and a plurality of clamp and motor assemblies 5. When attached to a sports apparatus, such as a snowboard 12, an operator 32 may activate the right and left motorized track systems to power the snowboard while drawing power from a battery in the battery housing 22. The operator 32 may use a controller, such as BT hand controller 16 to control steering and direction.

Figure 1A:
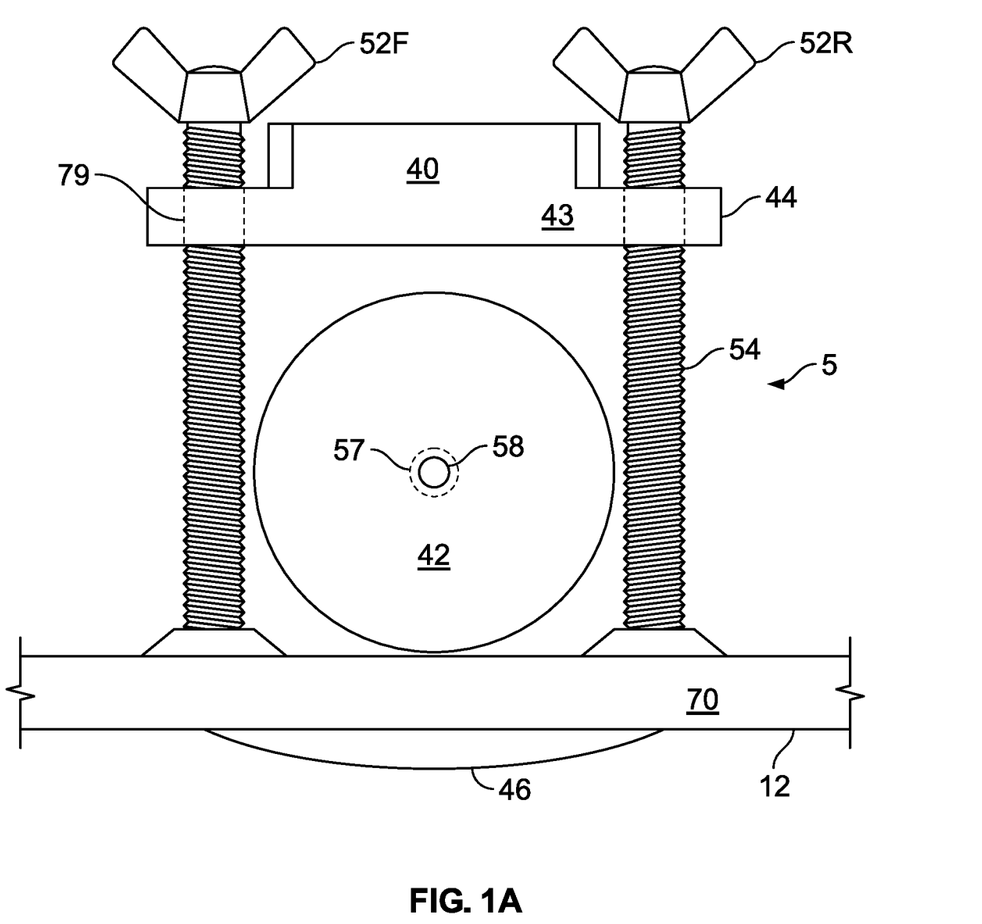
FIG. 1A schematically shows one example of a clamp and motor system.

Referring now to FIG. 1A, one example of a clamp and motor system is schematically shown. A clamp and motor assembly 5 includes a clamp 40 having a clamp frame 44 and a clamp handle 52, an electric motor 42, and a pair of parallel threaded screws 54. The clamp frame 44 includes a fixed jaw 46 and an upper arm 43. The upper arm 43 may include an opposing pair of threaded collars 79 for accepting the threaded screws 54. The frame also includes a channel 57 for inserting the driveshaft 58. The driveshaft 58 is rotatably attached to a gear reduction assembly as described in detail below with reference to FIG. 6A.

In some examples the electric motor 42 may comprise a commercially available motor which typically operates between 140 kV and 190 kV. The gear reduction assembly may advantageously be configured to have a gear down ratio of in the range of at least 5 to 1, 4 to 1, 3 to 1 or 2 to 1. In one useful example, the threaded screws 54 may have a minimum length of 65 to 71 inches between the top surface of the snowboard and a bottom surface of the fixed jaw 46. In a similar example, the width between the outer diameters of the threaded screws 54 may be about 104 mm to accommodate a blue tooth motor having a diameter of 63 mm. Of course, this is only one useful example and is not meant to be limiting.

Figure 2:
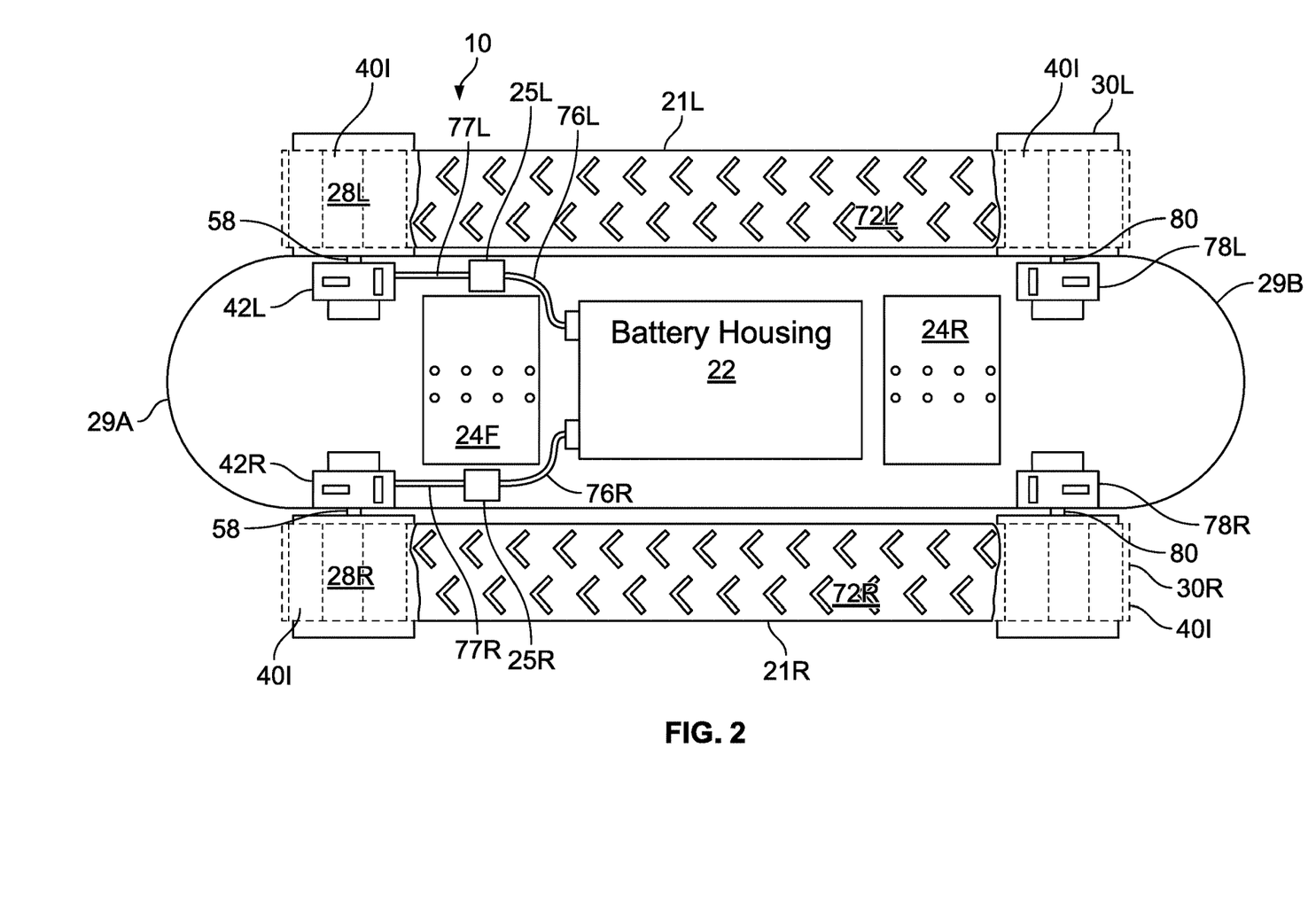
FIG. 2 schematically shows an example of a top view of a snowboard with an electronically controlled detachable motorized track system installed.

Referring now to FIG. 2, an example of a top view of a snowboard with an electronically controlled detachable motorized track system installed is schematically shown. One useful example of the detachable motorized track system 10 is shown in a top-down view of the snowboard 12 with the drive rollers 28R, 28L and rear rollers 30R, 30L visible as the portion of the right motorized track 21R and the left motorized track 21L covering the rollers are partial cutaway views. Also shown are the drive motors 42R, 42L, the battery housing 22, and the rear roller clamps 78L, 78R.

There are advantages for using long tracks, such as tracks 21R, 21L with a gear reduction scheme as compared to shorter tracks impelled by direct drive motors. One advantage is improved traction because a larger foot print on the snow with a gear reduction improves hill climbing while drawing lower battery current. The ability to use lower gearing decreases maximum amperage when going up steep inclines. In one example the tracks 21R, 21L may be installed in parallel and centered between the right end 29A and the left end 29B of the board. The tracks may run longitudinally parallel to the board and have a length between about 70% and 90% of the snowboard length.

In one example, connected to the battery housing are cables 76L, 76R, which are, in turn each connected to electrical cable quick connectors 25R, 25L. Completing the right circuit is cable 77R which couples the electrical cable quick connectors 25R to the right drive motor 42R. The correspond left circuit is similarly connect with cable 77L. Also shown for positioning are front and rear boot placement areas 24F, 24R. Placement of the battery housing 22 and the circuitry therein is described in more detail below.

As also can be seen, each of the drive rollers 28L, 28R and the rear rollers 30R, 30L may include a plurality of protrusions, for example, raised protrusions 401 for gaining purchase on the bottom services of the belts 72R, 72L so as to improve traction and prevent slippage. The fins may not be needed in all instances. In other cases the rollers may be treated on the surface for roller lagging. Roller lagging is the process of covering the surface of rollers to increase traction, prevent premature wear, improve alignment between the roller and a belt, and extend the overall lifetime of the system. Lagging is also used to protect the surface of the roller from damaging media such as rocks, abrasive materials, and or chemicals. Roller lagging is often used in conveyor applications.

Figure 3:
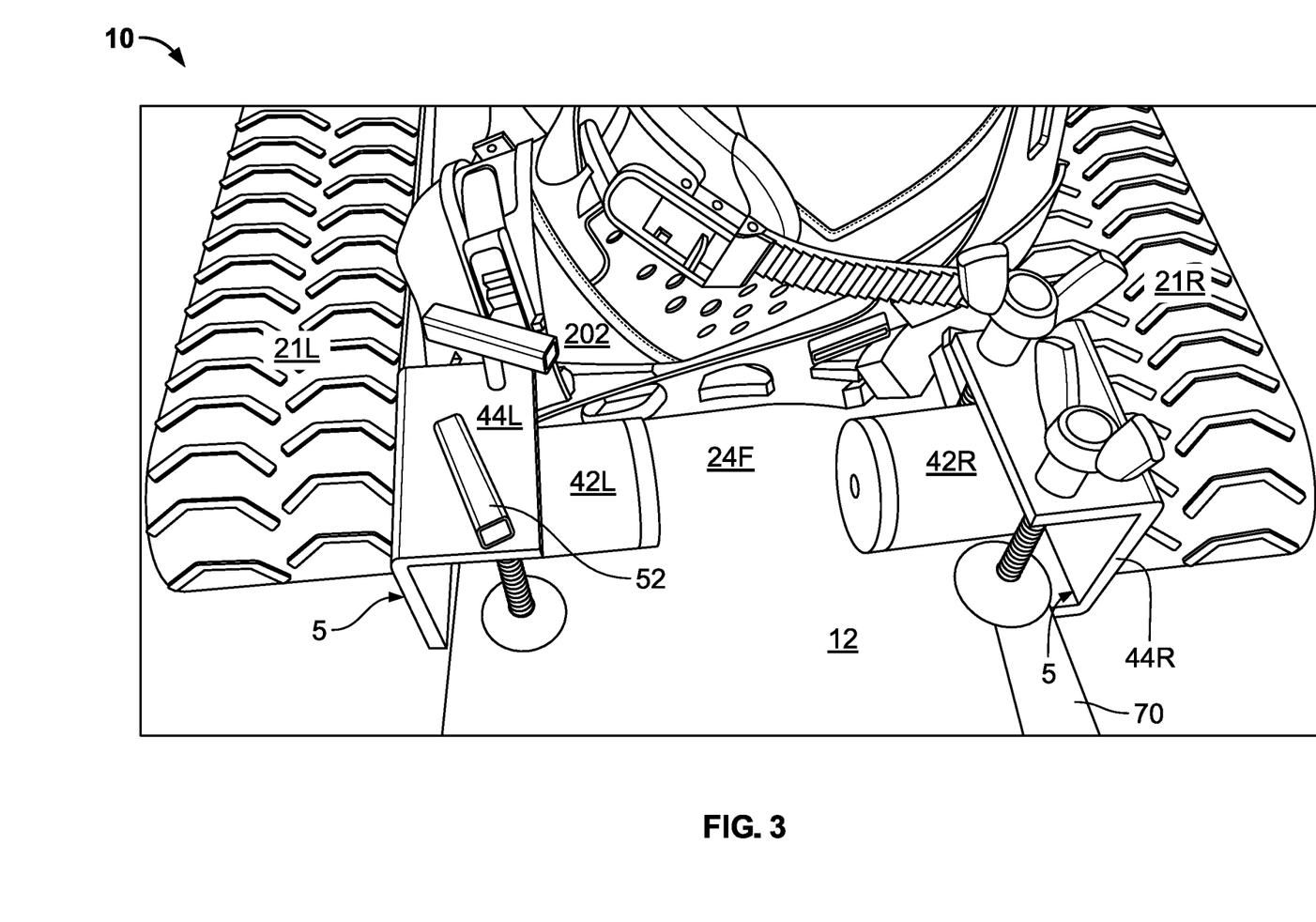
FIG. 3 schematically shows an example of a pair of opposing drive motors each attached within a clamping system installed on a snowboard.

Referring now to FIG. 3, an example of a pair of opposing drive motors each attached within a clamping system installed on a snowboard is schematically shown. The detachable motorized track system 10 is installed on a snowboard 12, a pair of clamp and motor assemblies 5 are advantageously positioned proximate the front of the snowboard 12 and positioned transversely to the longer edge 70 of the snowboard 12. Here shown as part of a detachable motorized track system 10, are two clamps, a right clamp 44L and a left clamp 44R, as assembled to the clamp 40. Each clamp and motor assembly 5 includes a pair of the clamp handles 52. When in use, an operator will affix their boots 202 to the front and rear boot placement areas 24F, 24R. Here shown is the front placement, note that the clamp and motor assemblies 5 are placed forward of the front boot placement area 24F so as to leave the operator room for maneuvering without interfering with the detachable motorized track system 10.

Figure 4:
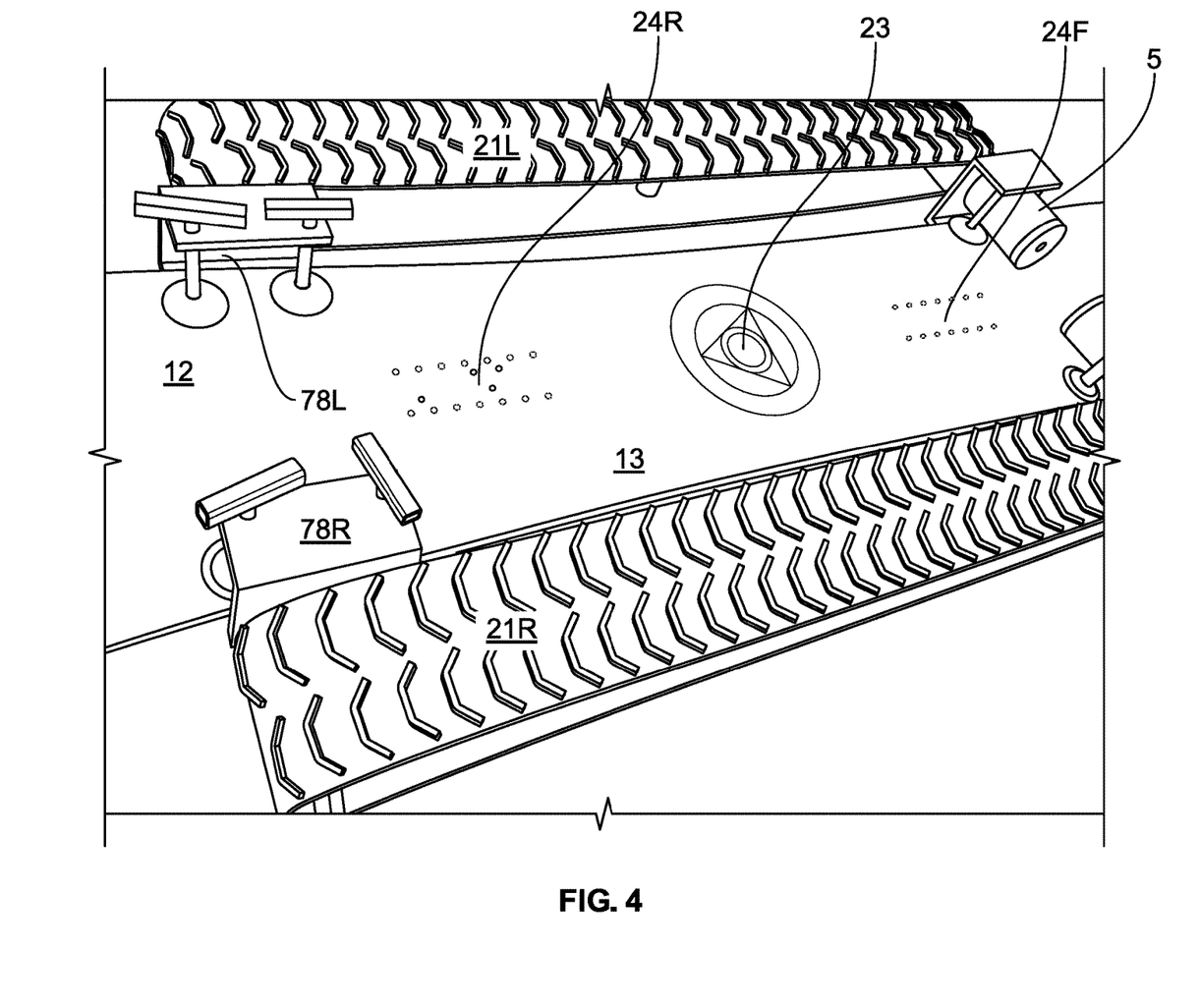
FIG. 4 schematically shows an example of a clamp and motor system for driving parallel dual tracks.

Referring now to FIG. 4, an example of a top view of a snowboard with an electronically controlled detachable motorized track system installed is schematically shown. Here shown are the detachable motorized track system 10, the front boot placement area 24F parallel tracks 21L, 21R, a top surface 13 of the snowboard 12, the right and the left clamp and motor assemblies 5, and right and left rear clamps 78L, 78R. In one example the battery housing 22 (shown in other views) may be temporarily affixed to a battery installation region 23, which in turn can be located on the snowboard 12 between the front in rear boot placement areas 24F, 24R.

Figure 5:
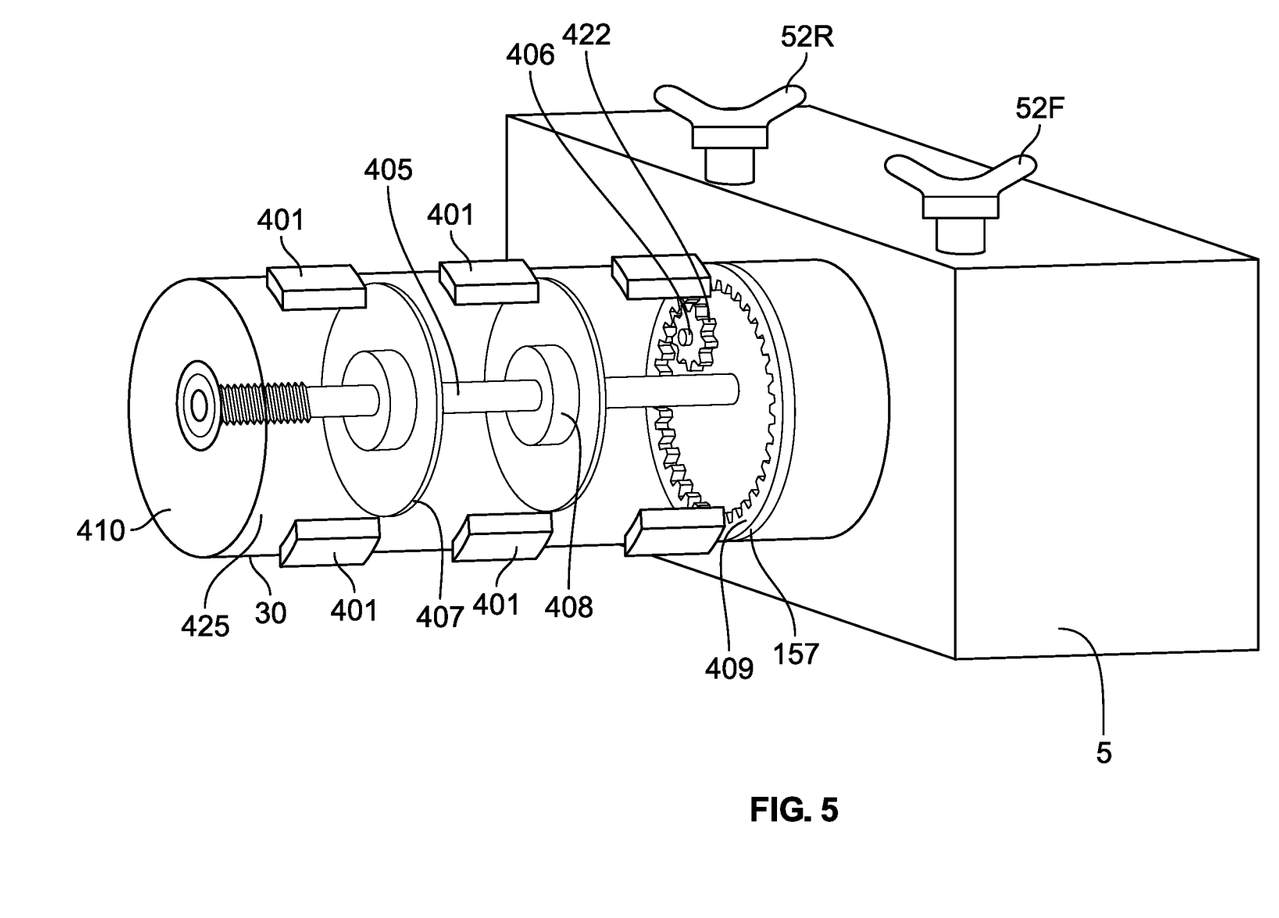
FIG. 5 schematically shows an inside view of an example of a front roller including a gear reduction mechanism attached to one of the drive motors.

Referring now to FIG. 5, an example of an electronic motor and gear reduction assembly attached to a front drive roller is schematically shown. The driver roller 30 is rotatably attached to axle 405 which, in turn is attached to be driven by gear reduction assembly 157. Gear reduction assembly 157 includes a drive gear 422 affixed to motor drive axle 406. The gear reduction assembly 157 also includes an inner planetary gear 409 adapted to mesh with the drive gear 422. At least two bearings 408 are affixed to the axle 405 within wheel structures 407. The bearing and wheel structure when thus assembled will fit snugly within the interior of the drive roller 30. However, all of the components including the bearings, wheel structures 407 and gear reduction assembly 157 are adapted to be individually removable and interchangeable with other parts depending upon the type of motor being used in the amount of gear reduction desired.

Still referring to FIG. 5, each driver roller preferably includes a removable cover 410. Additionally, as discussed above a plurality of fins or other protrusions 401 may be affixed to the outer surface 425 of the roller driver 30.

Figure 6:
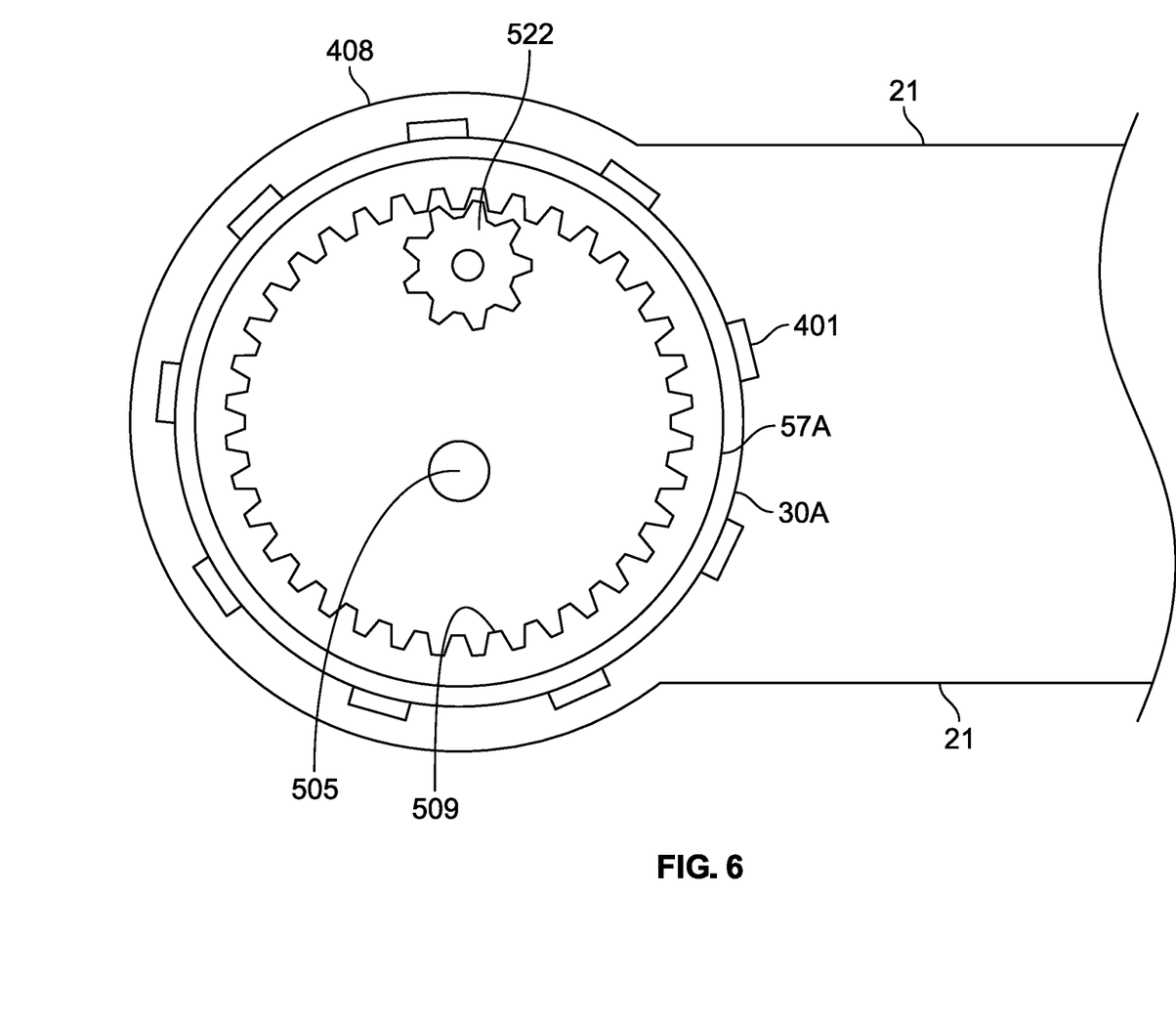
FIG. 6 schematically shows a side view of one example of an alternate example of a gear reduction assembly.

Referring now to FIG. 6, a side view of one example of an alternate example of a gear reduction assembly is schematically shown. In an alternate example, the driver roller 30A is rotatably attached to axle 505 which, in turn is attached to be driven by gear reduction assembly 157A. Gear reduction assembly 157A includes an alternate drive gear 522 affixed to motor drive axle 406. The gear reduction assembly 157A also includes an alternate inner planetary gear 509 adapted to mesh with the alternate drive gear 522. As discussed above, a plurality of fins or other protrusions 401 a be affixed to the outer surface of the drive roller 30A. The track 21 is wrapped around the driver roller 30A and impelled around the roller driver by the friction force impinged on the track by the roller driver and its fins. In certain embodiments it may not be necessary to use fins or other such devices as discussed above.

Figure 6A:
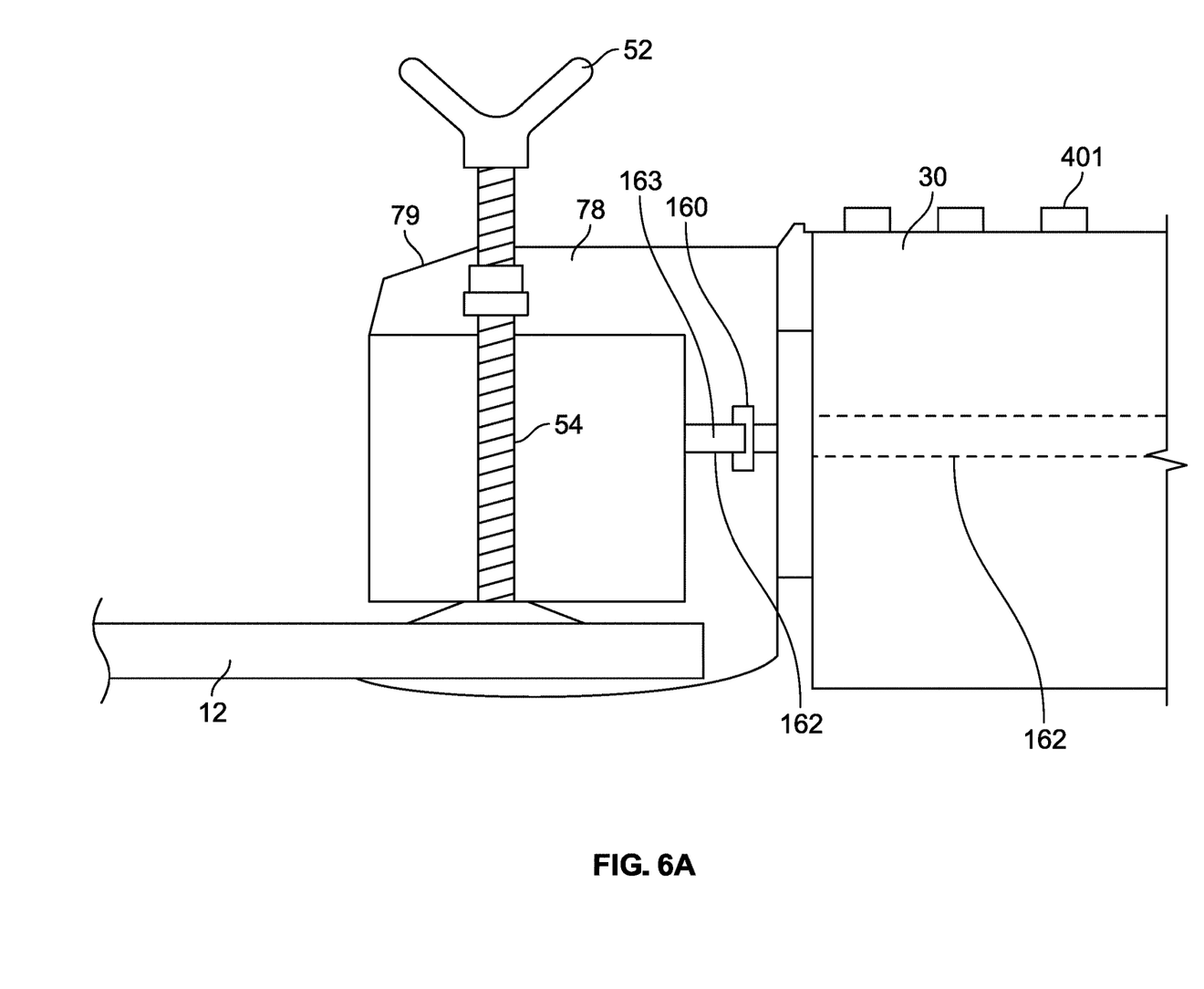
FIG. 6A schematically shows a side view of one example of a rear clamp and roller assembly.

FIG. 6A schematically shows a side view of one example of a rear clamp and roller assembly. Both the left rear roller 30L and the right rear roller 30R are separately and symmetrically assembled to rear roller clamps 78L, 78R respectively on opposing sides of the snowboard 12. Elements and structure of each rear roller include a rear roller 30, a clamp 78, an axle 162 and a bearing 160. The clamp 78 is built substantially identically to the clamp and motor assemblies described above, except that the motor is not needed and is left out. Instead an axle 162 is pressed into an aperture 163 in the clamp 78. The axle 162 is rotatably attached to a central axis of the rear roller 30. Similar to the drive roller described with respect to FIG. 5 above, at least two bearings (as shown FIG. 5) are affixed to the axle 162 within wheel structures (shown as wheel structures 407 in FIG. 5). The bearing and wheel structures when thus assembled will fit snugly within the interior of the drive roller 30. However, as described with respect to FIG. 5 a part of all of the components including the bearings and wheel structures are adapted to be individually removable and interchangeable. Additionally, as discussed above a plurality of fins or other protrusions 401 may be affixed to the outer surface 425 of the rear roller 30.

Figure 7:
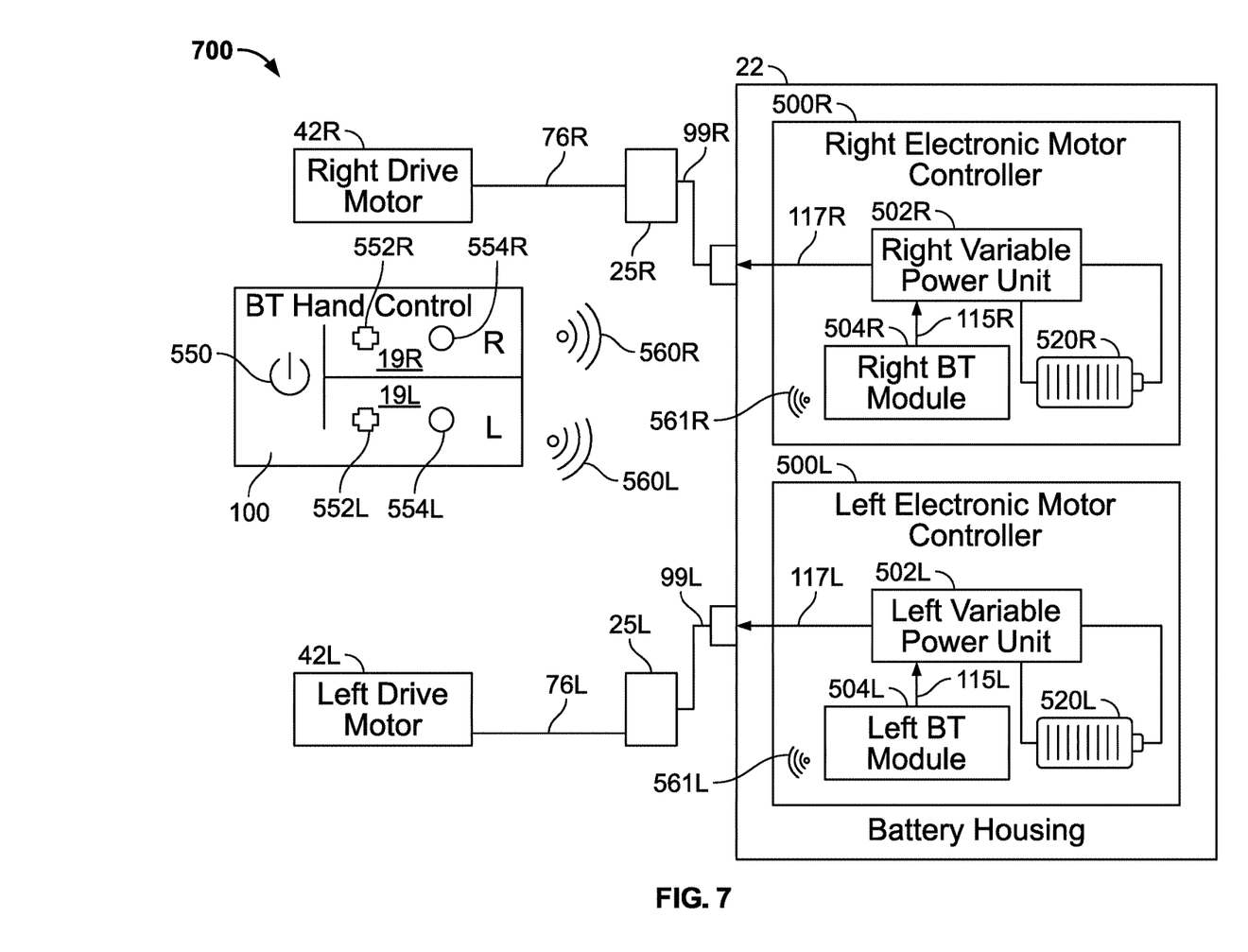
FIG. 7 schematically shows an example of a power and control system used to drive the electronically controlled detachable motorized track system.

Referring now to FIG. 7, an example of a power and control system used to drive the electronically controlled detachable motorized track system is schematically shown. In one example, a power and control system 700 may include a handheld Bluetooth controller 16, the battery housing 22, the right drive motor 42R, the left drive motor 42L, and electric cable quick connectors 25R, 25L. The battery housing 22 includes dual electronic motor controllers 500R, 500L. Each electronic motor controller controls a drive motor 42R, 42L in response to control signals received from the operator manipulating the BT hand control 16. The right and left electronic motor controllers 500R, 500L may be substantially identical in construction. Each is separately electronically coupled to a drive motor.

The right electronic motor controller 500R includes a right variable power unit which receives signals from a right BT module 504R. Power is supplied by a battery 520R. Signals 561R received from the BT hand control 16 by the right BT module 504R and processed into electronic control signals which are then transmitted to the right variable power unit 502R. Similarly, the left electronic motor controller 500L includes a right variable power unit which receives signals from a right BT module 504L. Power is supplied by a battery 520L. Signals 561L received from the BT hand control 16 by the left BT module 504L and processed into electronic control signals which are then transmitted to the left variable power unit 502L.

The BT hand control 16 may advantageously include a power button 550, right and left axis control switches 552R, 552L and right and left speed control switches 554R, 554L. The right and left hand control buttons and switches transmit separate Bluetooth® frequency wireless signals 560R, 560L to the right and left BT modules. The right and left BT modules respond to the wireless signals by processing the wireless signals into electronic signals compatible with the right and left variable power units and which represent the commands impressed on the BT hand control 16 by the operator. Each variable power unit responds to the control signals 115R, 115L by supplying varying current 117R, 117L through cables 99R, 99L that raise or lower the power supplied to the motors through the power cables 76R, 76L. In this way, the motors speed up or slow down in response to the current received.

As a result, by using the hand control the operator can individually control the drive motors which turn the drive rollers and cause the tracks to move at different speeds. Direction is controlled by activating one or the other of the right or left tracks. If both tracks are activated at the same speed, for example, the snowboard will be driven forward.

Figure 8:
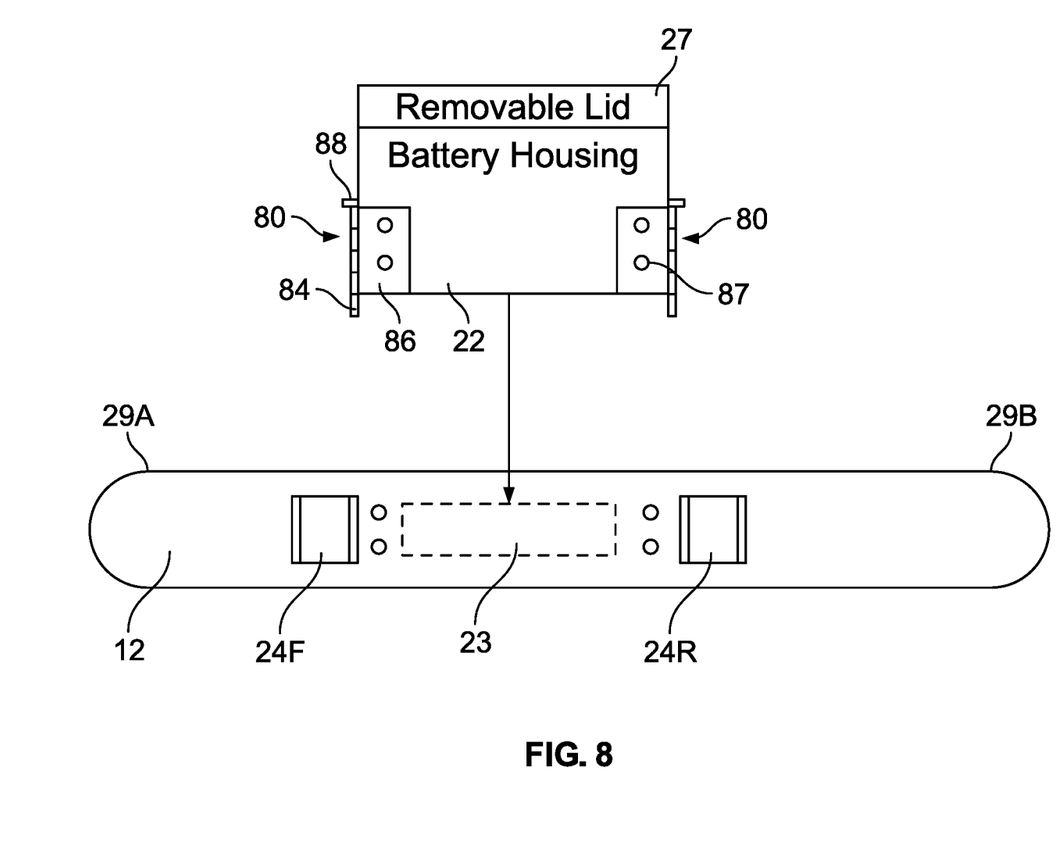
FIG. 8 schematically shows the placement relationship between the battery housing, a battery base and the snowboard.

Referring now to FIG. 8, the placement relationship between the battery housing, a battery base and the snowboard is schematically shown. In one example the battery housing 22 including a BT controller 100 housed therein may be placed on a battery installation region 23, which in turn can be located on the snowboard 12 in between the front and rear boot placement areas 24F, 24R. BT controller 100 may be segmented into a right control section 19R and a left control section 19L Also attached to the battery housing as, for example by screws 87, are a plurality of quick connect assemblies 80. The quick connect assemblies 80 are attached to each corner of the battery housing and aligned with pre-existing apertures 90 in the snowboard 12. The battery housing has a removable lid 27 which allows access to the batteries for replacement when needed.

Figure 9:
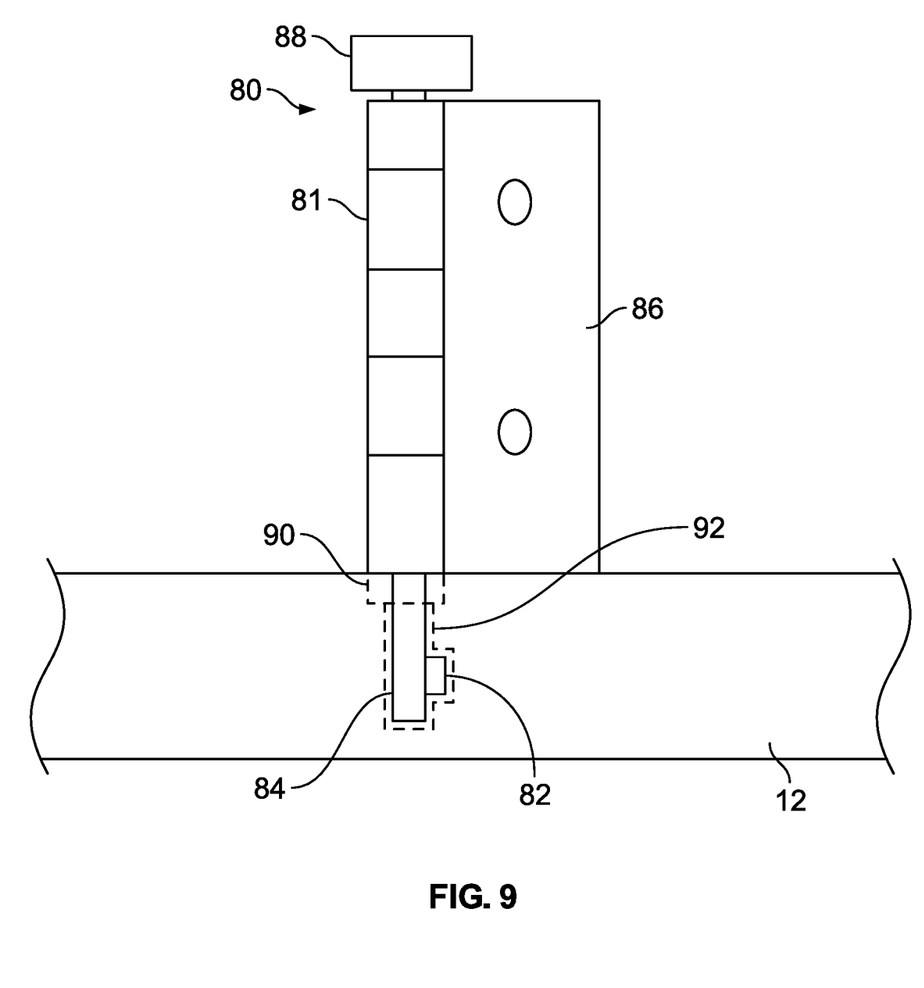
FIG. 9 schematically shows an example of a quick connect fixture for attaching the battery housing to a snowboard top surface.

Referring now to FIG. 9, an example of a quick connect fixture for attaching the battery housing to a snowboard top surface is schematically shown. Each of the plurality of quick connect assemblies 80 comprise a plate 86, a cylinder 81, and a pin 84. The pin 84 includes a head 88 and a spring loaded detent 82. The snowboard aperture 92 is structured to hold the spring loaded detent 82 within the snowboard when the spring loaded detent 82 is extended. In order to use the quick connect assemblies 80 in order to connect the battery housing to the snowboard surface, the user aligns the quick connect assemblies 80 with, for example, four of the pre-existing apertures 90 and presses the pins 84 into the apertures until the spring loaded detents lock in place.

Having described the elements of a detachable motorized track system for a snowboard adapted to be carried in a backpack, it is considered helpful to the understanding of the system to provide an example of use. In one example, an electronically controlled detachable motorized track kit for a snowboard having front and rear baseplates sized to fit in a backpack may be obtained by a user. The kit may advantageously include a right motorized track having a length extending beyond the front and rear baseplates from proximate the rear of a snowboard to proximate the front of a snowboard and beyond the front and rear baseplates; a left motorized track having substantially the same length as the right motorized track; the right motorized track is adapted to be wrapped around a right drive roller and a rear right roller; the left motorized track is adapted to be wrapped around a left drive roller and a rear left roller; a battery housing; at least one battery housed within the battery housing; at least two clamps, each clamp having a clamp frame, a clamp handle, and a threaded screw assembled therein; at least two electric drive motors, each separately affixed within one of the at least two clamps, where each electric drive motor includes a driveshaft and is adapted to be connected to the battery housing; where each of the at least two clamps has a clamp frame including a fixed jaw and an upper arm and each upper arm has a threaded collar for accepting the threaded screw and the frame also includes a channel for inserting the driveshaft; a right drive roller including a right gear reduction assembly rotatably attached to one of the at least two electric drive motors; and a left drive roller including a left gear reduction assembly rotatably attached to another one of the at least two electric drive motors; a left drive roller including a left gear reduction assembly rotatably attached to another one of the at least two electric drive motors; wherein the right gear reduction assembly and left gear reduction assembly comprise gear reduction assemblies configured to have a gear down ratio of in the range of 5 to 1-2 to 1; a plurality of clamp and rear roller assemblies including at least two clamps, each clamp having a clamp frame, a clamp handle, an axle and a threaded screw assembled therein,
the axle is rotatably mounted with a bearing;
each clamp frame includes a fixed jaw and an upper arm, and the upper arm has a threaded collar for accepting the threaded screw and the frame also includes a channel for inserting the axle;
the axle is rotatably attached to a rear roller;
a hand controller including right and left control switches; a right electronic motor controller housed within the battery housing, connected to the at least one battery, and adapted to be wirelessly coupled to respond to signals from the right switches of hand controller; a left electronic motor controller housed within the battery housing with at least one battery, and adapted to be wirelessly coupled to respond to signals from the left switches of the hand controller; and wherein the right electronic motor controller housed within the battery housing and the left electronic motor controller each include right and left modules adapted to respond to the wireless signals by processing the wireless signals into electronic signals compatible with the right and left variable power units and which represent commands impressed on the hand control by the operator.

All of the items in the kit may be contained in a backpack which an operator or user could carry to a snow run with a snowboard. Upon reaching the snow run the operator would assemble the various items in the kit using quick connects. The major components would most advantageously be assembled prior to assembling to the snowboard and would include the tracks, rollers, clamps and motors assembled to major assemblies which would then be mounted to the snowboard using quick connect attachments. The operator could then, but not necessarily in this order, attached the battery housing to the board and, using the quick connect electrical connectors and at the battery to the various electronic components such as motors. The operator would then use the hand controller to control the board and be propelled up to the top of the snow run.

Upon reaching the top of the snow run, the operator would disassemble all of the components from the board and still them in the backpack. This could be repeated as many times as desirable. From time to time, fresh spare batteries can replace discharged batteries by opening the battery housing lid to gain access to the discharged batteries.

Certain exemplary embodiments of the invention have been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. An electronically controlled detachable motorized track system for a snowboard having front and rear baseplates sized to fit in a backpack comprising:
   a right motorized track having a length extending beyond the front and rear baseplates from proximate the rear of a snowboard to proximate the front of a snowboard and beyond the front and rear baseplates;
   a left motorized track having substantially the same length as the right motorized track;

the right motorized track is adapted to be wrapped around a right drive roller and a rear right roller;

the left motorized track is adapted to be wrapped around a left drive roller and a rear left roller;

a battery housing;

at least one battery housed within the battery housing;

at least two clamps, each clamp having a clamp frame, a clamp handle, and a threaded screw assembled therein, at least two electric drive motors, each separately affixed within one of the at least two clamps, where each electric drive motor includes a driveshaft and is adapted to be connected to the battery housing;

where each of the at least two clamps has a clamp frame including a fixed jaw and an upper arm and each upper arm has a threaded collar for accepting the threaded screw and the clamp frame also includes a channel for inserting the driveshaft;

a right drive roller including a right gear reduction assembly rotatably attached to one of the at least two electric drive motors;

a left drive roller including a left gear reduction assembly rotatably attached to another one of the at least two electric drive motors;

a plurality of clamp and rear roller assemblies including
at least two clamps, each clamp having a clamp frame, a clamp handle, an axle and a threaded screw assembled therein,
the axle is rotatably mounted with a bearing,
each clamp frame includes a fixed jaw and an upper arm, and the upper arm has a threaded collar for accepting the threaded screw and the clamp frame also includes a channel for inserting the axle,
the axle is rotatably attached to a rear roller, a hand controller including right and left control switches;

a right electronic motor controller housed within the battery housing, connected to the at least one battery, and adapted to be wirelessly coupled to respond to right wireless signals from a set of right switches of hand controller; and a left electronic motor controller housed within the battery housing, at least one battery, and adapted to be wirelessly coupled to respond to left wireless signals from a set of left switches of the hand controller.

2. The system of claim 1 wherein the right electronic motor controller housed within the battery housing and the left electronic motor controller each include right and left modules adapted to respond to the right and left wireless signals respectively by processing the right and left wireless signals respectively into electronic signals compatible with the right and left modules and which represent commands impressed on the hand controller.

3. The system of claim 1 wherein the hand controller emits a plurality of short-wavelength radio waves.

4. The system of claim 1 wherein each of the right and left drive rollers include a plurality of fins affixed to an outer surface.

5. The system of claim 1 wherein the at least two electric drive motors comprise electric drive motors that operate between 140 kV and 190 kV.

6. The system of claim 1 wherein the right gear reduction assembly and left gear reduction assembly comprise gear reduction assemblies configured to have a gear down ratio in the range of 5 to 1 through 2 to 1.

7. The system of claim 1 wherein the battery housing includes a plurality of right cables and a plurality of left cables each connected to a quick connect plug.

8. The system of claim 1 wherein the battery housing includes a plurality of quick connect assemblies adapted to be attached to existing apertures in a snowboard.

9. The system of claim 8 wherein each of the plurality of quick connect assemblies comprise:
a plate;
a cylinder attached to the plate;
and a pin adapted to be inserted into the cylinder, where the pin includes a head and a spring loaded detent.

10. The system of claim 1 wherein the right and left wireless signals are Bluetooth signals.

11. An electronically controlled detachable motorized track kit for a snowboard having front and rear baseplates sized to fit in a backpack comprising:

a right motorized track having a length extending beyond the front and rear baseplates from proximate the rear of a snowboard to proximate the front of a snowboard and beyond the front and rear baseplates;

a left motorized track having substantially the same length as the right motorized track;

the right motorized track is adapted to be wrapped around a right drive roller and a rear right roller;

the left motorized track is adapted to be wrapped around a left drive roller and a rear left roller;

a battery housing;

at least one battery housed within the battery housing;

at least two clamps, each clamp having a clamp frame, a clamp handle, and a threaded screw assembled therein;

at least two electric drive motors, each separately affixed within one of the at least two clamps, where each electric drive motor includes a driveshaft and is adapted to be connected to the battery housing;

where each of the at least two clamps has a clamp frame including a fixed jaw and an upper arm and each upper arm has a threaded collar for accepting the threaded screw and the clamp frame also includes a channel for inserting the driveshaft;

a right drive roller including a right gear reduction assembly rotatably attached to one of the at least two electric drive motors;

a left drive roller including a left gear reduction assembly rotatably attached to another one of the at least two electric drive motors;

a plurality of clamp and rear roller assemblies including
at least two clamps, each clamp having a clamp frame, a clamp handle, an axle and a threaded screw assembled therein,
the axle is rotatably mounted with a bearing,
each clamp frame includes a fixed jaw and an upper arm, and the upper arm has a threaded collar for accepting the threaded screw and the clamp frame also includes a channel for inserting the axle,
the axle is rotatably attached to a rear roller;

a hand controller including right and left control switches;

a right electronic motor controller housed within the battery housing, connected to the at least one battery, and adapted to be wirelessly coupled to respond to right wireless signals from the a set of right switches of hand controller; and a left electronic motor controller housed within the battery housing, at least one battery, and adapted to be wirelessly coupled to respond to left wireless signals from a set of left switches of the hand controller.

12. The kit of claim 11 wherein the right electronic motor controller housed within the battery housing and the left electronic motor controller each include right and left modules adapted to respond to the right and left wireless signals respectively by processing the right and left wireless signals respectively into electronic signals compatible with the right and left modules and which represent commands impressed on the hand controller.

13. The kit of claim 11 wherein the hand controller emits a plurality of short-wavelength radio waves.

14. The kit of claim 11 wherein each of the right and left drive rollers include a plurality of fins affixed to an outer surface.

15. The kit of claim 11 wherein at least two electric drive motors comprise electric drive motors that operate between 140 kV and 190 kV.

16. The kit of claim 11 wherein the right gear reduction assembly and left gear reduction assembly comprise gear reduction assemblies configured to have a gear down ratio in the range of 5 to 1 through 2 to 1.

17. The kit of claim 11 wherein the battery housing includes a plurality of right cables and a plurality of left cables each connected to a quick connect plug.

18. The kit of claim 11 wherein the battery housing includes a plurality of quick connect assemblies adapted to be attached to existing apertures in a snowboard.

19. The kit of claim 18 wherein the quick connect assemblies comprise:
   a plate;
   a cylinder attached to the plate;
   and a pin adapted to be inserted into the cylinder, where the pin includes a head and a spring loaded detent.

20. An electronically controlled detachable motorized track kit for a snowboard having front and rear baseplates sized to fit in a backpack comprising:
   a right motorized track having a length extending beyond the front and rear baseplates from proximate the rear of a snowboard to proximate the front of a snowboard and beyond the front and rear baseplates;
   a left motorized track having substantially the same length as the right motorized track;
   the right motorized track is adapted to be wrapped around a right drive roller and a rear right roller;
   the left motorized track is adapted to be wrapped around a left drive roller and a rear left roller;
   a battery housing;
   at least one battery housed within the battery housing;
   at least two clamps, each clamp having a clamp frame, a clamp handle, and a threaded screw assembled therein;
   at least two electric drive motors, each separately affixed within one of the at least two clamps, where each electric drive motor includes a driveshaft and is adapted to be connected to the battery housing;
   where each of the at least two clamps has a clamp frame including a fixed jaw and an upper arm and each upper arm has a threaded collar for accepting the threaded screw and the clamp frame also includes a channel for inserting the driveshaft;
   a right drive roller including a right gear reduction assembly rotatably attached to one of the at least two electric drive motors;
   a left drive roller including a left gear reduction assembly rotatably attached to another one of the at least two electric drive motors;
   wherein the right gear reduction assembly and left gear reduction assembly comprise gear reduction assemblies configured to have a gear down ratio in the range of 5 to 1 through 2 to 1;
   a plurality of clamp and rear roller assemblies including
      at least two clamps, each clamp having a clamp frame, a clamp handle, an axle and a threaded screw assembled therein,
      the axle is rotatably mounted with a bearing;
      each clamp frame includes a fixed jaw and an upper arm, and the upper arm has a threaded collar for accepting the threaded screw and the clamp frame also includes a channel for inserting the axle;
      the axle is rotatably attached to a rear roller;
   a hand controller including right and left control switches;
   a right electronic motor controller housed within the battery housing, connected to the at least one battery, and adapted to be wirelessly coupled to respond to signals from the a set of right switches of hand controller;
   a left electronic motor controller housed within the battery housing, at least one battery, and adapted to be wirelessly coupled to respond to signals from a set of left switches of the hand controller; and
   wherein the right electronic motor controller housed within the battery housing and the left electronic motor controller each include right and left modules coupled to right and left variable power units respectively that are adapted to respond to the right and left wireless signals respectively by processing the right and left wireless signals respectively into electronic signals compatible with the right and left variable power units and which represent commands impressed on the hand control.

\* \* \* \* \*